United States Patent
Johansson

(10) Patent No.: US 9,672,408 B2
(45) Date of Patent: Jun. 6, 2017

(54) HIDDEN BIOMETRIC SETUP

(71) Applicant: Sony Mobile Communications Inc., Tokyo (JP)

(72) Inventor: Fredrik Johansson, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 197 days.

(21) Appl. No.: 14/627,010

(22) Filed: Feb. 20, 2015

(65) Prior Publication Data

US 2016/0247013 A1    Aug. 25, 2016

(51) Int. Cl.
*G06K 9/00* (2006.01)
*G06F 17/30* (2006.01)

(52) U.S. Cl.
CPC .... *G06K 9/00087* (2013.01); *G06F 17/30247* (2013.01); *G06K 9/00026* (2013.01); *G06K 9/00033* (2013.01); *G06K 9/00926* (2013.01)

(58) Field of Classification Search
None
See application file for complete search history.

(56) References Cited

U.S. PATENT DOCUMENTS

| | | | | |
|---|---|---|---|---|
| 5,313,556 A | * | 5/1994 | Parra | G10L 17/02 704/246 |
| 6,681,034 B1 | * | 1/2004 | Russo | G06K 9/00087 382/125 |
| 7,715,593 B1 | * | 5/2010 | Adams | G06Q 20/327 340/5.53 |
| 8,311,513 B1 | * | 11/2012 | Nasserbakht | G06Q 10/109 455/410 |
| 8,604,906 B1 | * | 12/2013 | Halferty | G05B 1/01 340/5.83 |
| 8,810,367 B2 | * | 8/2014 | Mullins | G06F 21/32 340/5.53 |

(Continued)

FOREIGN PATENT DOCUMENTS

WO    2015/072677 A1    5/2015

OTHER PUBLICATIONS

International Search Report and Written Opinion for corresponding International Application No. PCT/US2015/043050, mailed Nov. 25, 2015.

*Primary Examiner* — Iman K Kholdebarin
(74) *Attorney, Agent, or Firm* — Tucker Ellis, LLP

(57) ABSTRACT

A method, a device, and a non-transitory storage medium having instructions to invoke a setup of a fingerprint identification service of the user device, wherein the setup automatically sets up the fingerprint identification service without receiving a request from a user to set up the fingerprint identification service, capture, via the fingerprint reader, a fingerprint sample of the user of the user device; store the fingerprint sample; determine whether to generate a fingerprint template; generate the fingerprint template based on a determination to generate the fingerprint template; store the fingerprint template; provide a notification to the user that indicates that the fingerprint identification service can be activated; receive a request to activate the fingerprint identification service from the user; and activate the fingerprint identification service based on the request to activate the fingerprint identification service.

18 Claims, 12 Drawing Sheets

(56) References Cited

U.S. PATENT DOCUMENTS

| | | | | |
|---|---|---|---|---|
| 9,152,842 | B2* | 10/2015 | Vieta | G06K 9/00026 |
| 9,254,633 | B2* | 2/2016 | Rao | G06K 9/0002 |
| 9,361,440 | B2* | 6/2016 | Kramer | G06F 21/32 |
| 2004/0165755 | A1* | 8/2004 | Hillhouse | G06F 21/32 |
| | | | | 382/124 |
| 2004/0213437 | A1* | 10/2004 | Howard | G06F 17/30011 |
| | | | | 382/115 |
| 2006/0210127 | A1* | 9/2006 | Kim | G06F 3/0237 |
| | | | | 382/124 |
| 2008/0273768 | A1* | 11/2008 | Dennis | G06K 9/0012 |
| | | | | 382/124 |
| 2012/0252411 | A1* | 10/2012 | Johnsgard | G07C 9/00158 |
| | | | | 455/411 |
| 2013/0088434 | A1* | 4/2013 | Masuda | G06F 1/3262 |
| | | | | 345/173 |
| 2013/0260836 | A1* | 10/2013 | Tsunoda | H04M 1/0266 |
| | | | | 455/566 |
| 2014/0003677 | A1* | 1/2014 | Han | G06K 9/00006 |
| | | | | 382/124 |
| 2014/0075570 | A1* | 3/2014 | Hsu | G06F 21/32 |
| | | | | 726/28 |
| 2015/0254446 | A1* | 9/2015 | LaCous | G06F 21/32 |
| | | | | 726/19 |
| 2015/0358315 | A1* | 12/2015 | Cronin | H04L 63/0861 |
| | | | | 726/6 |
| 2015/0358790 | A1* | 12/2015 | Nasserbakht | G06F 17/30088 |
| | | | | 455/414.1 |

* cited by examiner

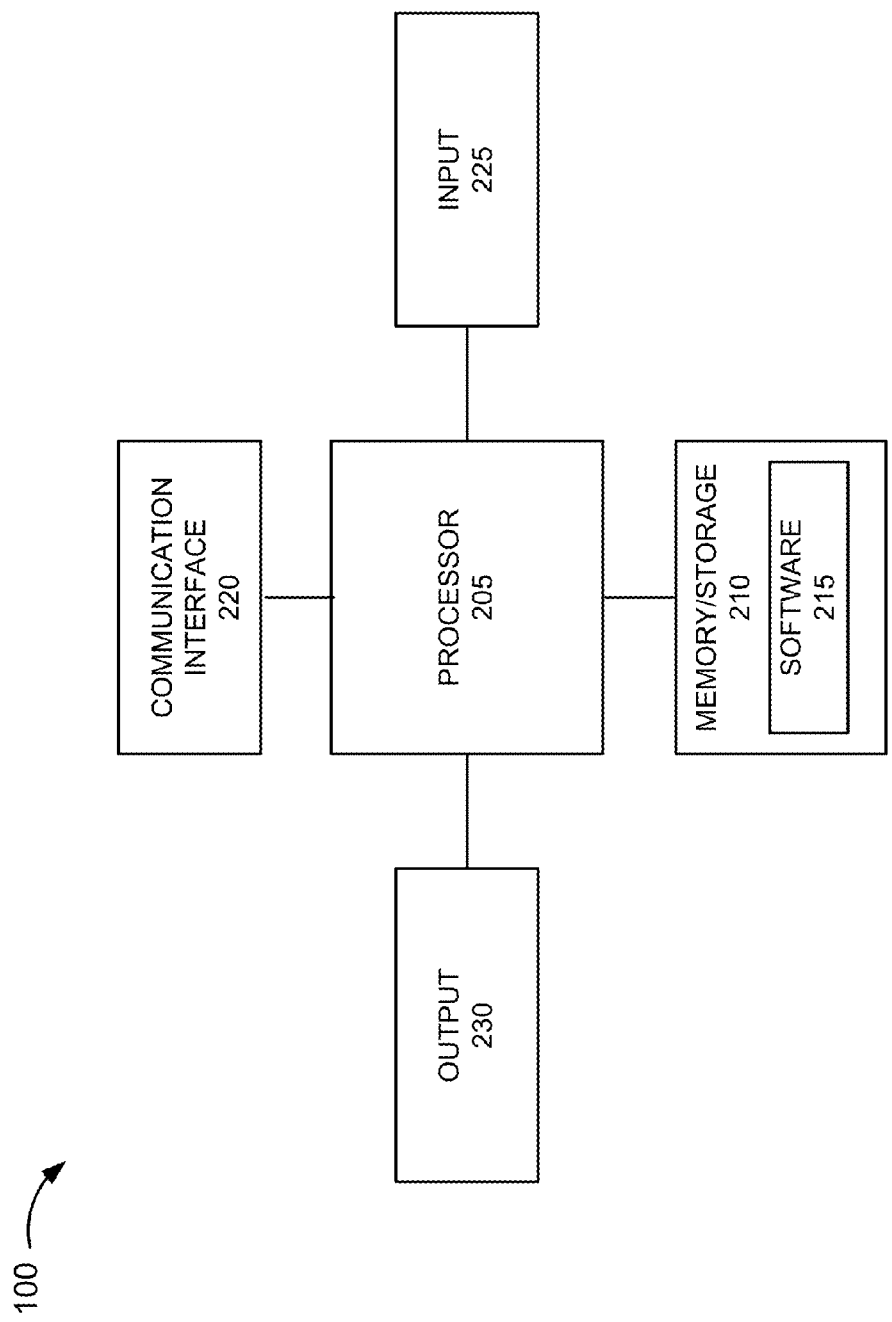

HIDDEN BIOMETRIC SETUP

BACKGROUND

A device, such as a mobile device, offers various services and applications to its user, such as a media service, a communication service, a navigation service, a business application, and web browsing. Additionally, users may store personal or sensitive information on the device. Accordingly, the device may provide various security services that aid the user in securing information stored on or accessible via the device. For example, the device may include a biometric-based security service that allows the device to authenticate the user before access and use of the device is permitted.

SUMMARY

According to one aspect, a method may comprise invoking, by a user device, a setup of a fingerprint identification service of the user device, wherein the setup automatically sets up the fingerprint identification service without receiving a request from a user of the user device to set up the fingerprint identification service; and wherein the setup may comprise capturing, by the user device, a fingerprint sample of the user of the user device; storing, by the user device, the fingerprint sample; determining, by the user device, whether to generate a fingerprint template; generating, by the user device, the fingerprint template based on determining to generate the fingerprint template; storing, by the user device, the fingerprint template; providing, by the user device, a notification to the user that indicates that the fingerprint identification service can be activated; receiving, by the user device, from the user, a request to activate the fingerprint identification service; and activating, by the user device, the fingerprint identification service based on the request to activate the fingerprint identification service.

According to another aspect, a user device may comprise a fingerprint reader; a memory, wherein the memory stores software; and a processor, wherein the processor may be configured to execute the software to invoke a setup of a fingerprint identification service of the user device, wherein the setup automatically sets up the fingerprint identification service without receiving a request from a user to set up the fingerprint identification service, and wherein the processor may be further configured to execute the software to: capture, via the fingerprint reader, a fingerprint sample of the user of the user device based on an invocation of the setup; store the fingerprint sample; determine whether to generate a fingerprint template; generate the fingerprint template based on a determination to generate the fingerprint template; store the fingerprint template; provide a notification to the user that indicates that the fingerprint identification service can be activated; receive a request to activate the fingerprint identification service from the user; and activate the fingerprint identification service based on the request to activate the fingerprint identification service.

According to yet another aspect, a non-transitory storage medium may store instructions executable by a processor of a computational device, which when executed, cause the computational device to invoke a setup of a biometric identification service of the computational device, wherein the setup automatically sets up the biometric identification service without receiving a request from a user to set up the biometric identification service; capture a biometric sample of the user of the computational device; store the biometric sample; determine whether to generate a biometric template; generate the biometric template based on a determination to generate the biometric template; store the biometric template; provide a notification to the user that indicates that the biometric identification service can be activated; receive a request to activate the biometric identification service from the user; and activate the biometric identification service based on the request to activate the biometric identification service.

DESCRIPTION OF THE DRAWINGS

FIG. 2A is a diagram illustrating exemplary components of the user device depicted in FIGS. 1A and 1B;

DETAILED DESCRIPTION OF PREFERRED EMBODIMENTS

Figure 1A:
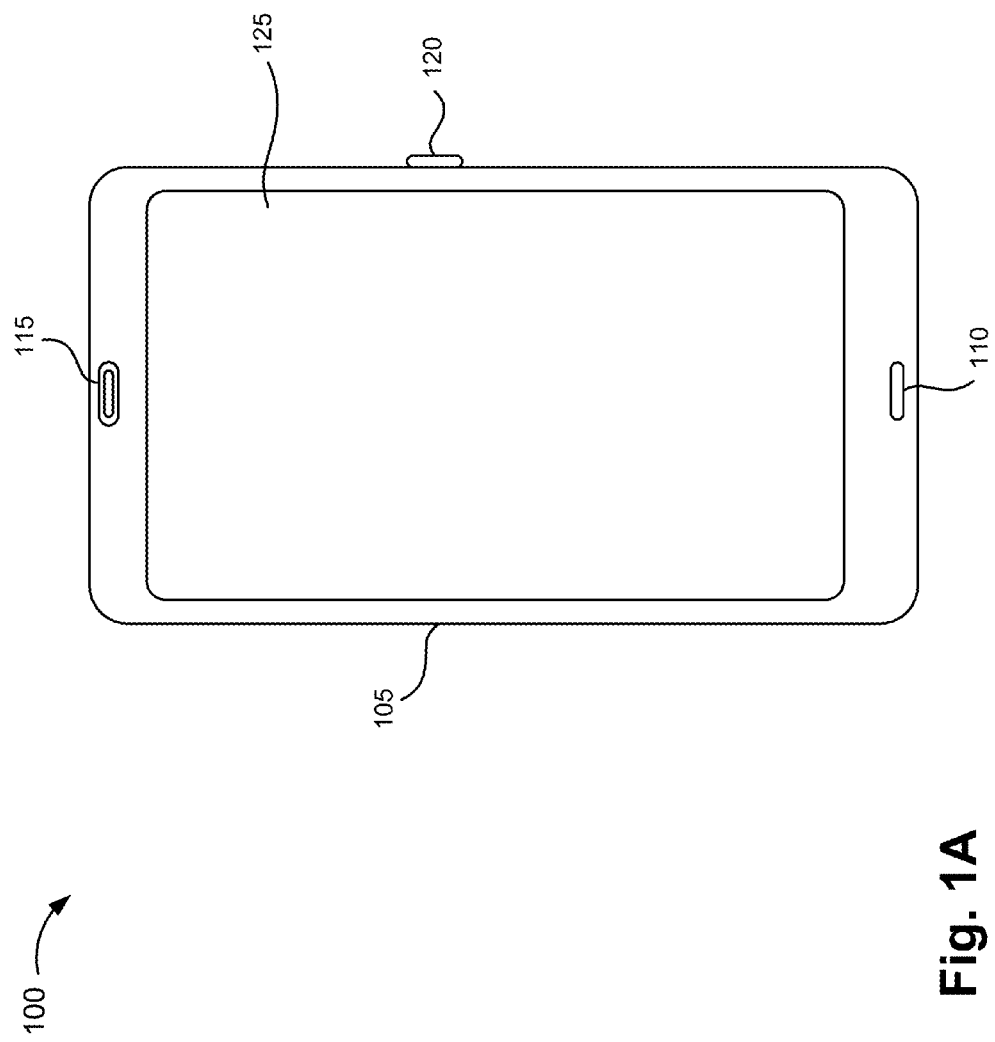
FIGS. 1A and 1B are diagrams illustrating an exemplary user device in which exemplary embodiments of hidden fingerprint setup may be implemented.

The following detailed description refers to the accompanying drawings. The same reference numbers in different drawings may identify the same or similar elements.

Various security measures can be used to prevent unauthorized access to a device. For example, many types of mobile devices offer lock screens that require some sort of input (e.g., a password, a PIN, a gesture, etc.) from users in order to use the mobile devices. Additionally, or alternatively, a device may use biometric verification measures to authenticate users. For example, the device may provide for voice identification, fingerprint identification, facial identification, eye (e.g., retinal or iris) identification, etc. Biometric technologies may also recognize users based on behavioral characteristics (e.g., characteristics of user's keystrokes, etc.) and/or other forms of identification (e.g., hand geometry, signature, etc.).

Biometric technologies may also mechanisms or software to prevent spoofing. By way of example, a fingerprint system may not be fooled by a fake fingerprint or an amputated finger. Rather, the fingerprint system may include live finger detection in which a live finger must be used.

Typically, the use of biometric verification requires a setup process in which biometric data is obtained from the user and stored. A biometric system analyzes the biometric data to identify a characteristic or a signature, which may be unique to the user. After completion of the setup process, the stored biometric data and/or other data stemming from the analysis, may be used as a comparative to biometric data and/or analyzed biometric data obtained from the user when trying to subsequently use and/or access the device. When the biometric system determines that there is a match between data, the biometric system permits the user to use or gain access to the device. Otherwise, the biometric system does not permit the user to use or gain access to the device.

Unfortunately, in some cases, users may deem the setup process for activating a biometric security service as cumbersome, time consuming, and/or an interruptive task. Additionally, the device may offer biometric verification as an optional service in which the user may choose or not choose to activate and use. In this regard, the user may elect to either forego the setup process altogether or continually procrastinate going through the setup process for some period of time.

According to an exemplary embodiment, a user device provides a "hidden" setup process directed towards activating a biometric security service. According to an exemplary implementation, the biometric security service includes a fingerprint identification service (also known in the art as a fingerprint verification or fingerprint authentication). According to other exemplary implementations, the biometric security service may or may not include the fingerprint identification service. For example, the biometric security service may include an retinal identification service, a voice identification service, and/or other types of security services, as mentioned elsewhere herein.

According to an exemplary embodiment, the user device provides a "normal" setup process directed towards activating the biometric security service. In contrast to the "hidden" setup process, the normal setup process is user-invoked. For example, the user may initiate a setup process (e.g., a wizard setup process, etc.) that allows the user device to initialize the biometric security service. By way of further example, the user may wish to activate a fingerprint identification service. The normal setup process may prompt the user to provide, among other things, a fingerprint sample of the user's finger. The normal setup process may generate a fingerprint template based on one or multiple fingerprint samples obtained and stored. After completion of the normal setup process, the fingerprint identification service can be activated.

According to an exemplary embodiment, the hidden setup process is not user-invoked. Rather, the user device automatically initiates the hidden setup process. According to an exemplary implementation, the hidden setup process operates as a background process on the user device and sets up the biometric security service. For example, the hidden setup process obtains biometric samples and generates a biometric template. According to an exemplary embodiment, the hidden setup process obtains a biometric sample from the user, without the user's knowledge (e.g., in a "hidden" manner), while the user uses the user device. Once the hidden setup process is completed, the user has the option to activate or not activate the biometric security service.

According to an exemplary embodiment, the biometric sample includes a fingerprint sample. For example, the user device may include a button that the user will normally operate and/or touch (e.g., when handling, holding, or grabbing the user device) when using the user device. According to an exemplary implementation, the button is a power button that turns on and turns off the user device and includes a fingerprint reader. According to other exemplary implementations, a button other than a power button includes the fingerprint reader. For example, the button may be a camera button, a key of a keyboard, a volume button, or some other type of button (e.g., a home button, a wakeup button, etc.). Still further, according to other exemplary implementations, the user device includes the fingerprint reader without being incorporated with a button. For example, the fingerprint reader may be incorporated into the housing of the user device.

When the user operates or touches the button, the hidden setup process obtains a fingerprint sample of the user. For example, the hidden setup process obtains the fingerprint sample when the user turns off the user device. Additionally, or alternatively, the hidden setup process obtains the fingerprint sample when the user places his or her finger on the button when simply holding the user device in his or her hand. As a result, the hidden setup process obtains a fingerprint sample (e.g., one or multiple fingerprint samples) from the user without the user's knowledge and without the user invoking the normal setup process.

According to an exemplary embodiment, the hidden setup process obtains "partial" fingerprint samples. For example, due to the size of a fingerprint reader relative to the size of the user's finger, a small portion or slice of the user's finger is sampled (i.e., a partial fingerprint sample). According to other embodiments, due to the size of the fingerprint reader, the hidden setup process obtains "full" fingerprint samples that are of sizes or areas equivalent to or nearly equivalent to a fingertip area of a person's finger or the entire finger.

According to an exemplary embodiment, the hidden setup process aggregates partial fingerprint samples. For example, the hidden process identifies matching portions (e.g., overlapping portions) between different partial fingerprint samples. Based on the identification of matching portions, the hidden setup process generates a more "complete" or "whole" fingerprint sample, as described further below.

According to other embodiments, the hidden setup process obtains a biometric sample via other components of the user device. For example, an eye tracker device may automatically obtain an eye (e.g., retinal) sample of the user as the user's looks at a display of the user device, without the user's knowledge and without the user invoking the normal setup process. Additionally, or alternatively, for example, a voice capture device may automatically obtain a vocal sample of the user (e.g., during a telephone call) without the user's knowledge and without the user invoking the normal setup process.

Unlike the normal setup process, the hidden setup process may obtain fingerprint samples from different fingers (including thumbs) since the user is not prompted, such as during a normal process setup scenario, to provide a fingerprint sample. Additionally, the normal setup process may request multiple fingerprint samples from the same finger of the user and perhaps even specify the finger to use (e.g., use the index finger, etc.). However, as previously mentioned, this is in contrast to what may occur during the hidden setup process.

In some cases, the user device may be used by a single user. The hidden setup process may obtain this information (e.g., whether the user device will be used by a single user or multiple users) in various ways. For example, during initialization, setup, and/or configuration of the user device, the user device may request or determine whether a single user or multiple users use the user device.

According to an exemplary embodiment, the hidden setup process generates one or multiple fingerprint templates for the user based on a fingerprint sampling pattern. For example, a user may use the same finger to turn off, via the button, the user device. Additionally, for example, during times between boot-up and shutdown of the user device, the user may grasp the user device in his or her hand such that the same finger or the same set of fingers from which a fingerprint sample may be obtained, is relatively consistent. The hidden setup process is able to identify the fingerprint sampling pattern stemming from the re-occurring sampling of the same set of fingers (e.g., one or multiple fingers) belonging to the user over a period of time. For example, the hidden setup process may compare fingerprint samples (or data representative of the fingerprint samples), which are stored (e.g., in a database or a data structure), to one another to determine whether the fingerprint samples pertain to a same finger of the user. The hidden setup process may identify the fingerprint sampling pattern based on one or multiple threshold values being satisfied, such as a threshold number of fingerprint samples being collected that belong to the same finger of the user, a threshold number of fingerprint samples being collected that belong to the same user, a threshold time period to collect fingerprint samples, a threshold quality of the fingerprint samples, and/or a threshold frequency of fingerprint samples belonging to the same finger of the user and/or the same user.

Additionally, or alternatively, the hidden setup process generates a fingerprint template based on a determination that an aggregation of partial fingerprint samples constitutes a "whole" or "sufficient" fingerprint sample. For example, as previously described, the hidden setup process may obtain partial fingerprint samples and generate a fingerprint sample (e.g., sufficient for performing authentication) based on the aggregation of the partial fingerprint samples. According to an exemplary implementation, the hidden setup process determines whether to generate a fingerprint template based on whether the aggregation of partial fingerprint samples is representative of a "whole" or "sufficient" fingerprint sample. For example, the hidden setup process may use a threshold value that indicates a minimum area or size corresponding to a "whole" fingerprint sample. The hidden setup process may compare the size or the area yielded from the aggregated, partial fingerprint samples to the threshold value. Based on the comparison, the hidden setup process determines whether the aggregation of partial fingerprint samples constitutes a "whole" fingerprint sample.

Additionally, or alternatively, the hidden setup process may generate the fingerprint template based on the aggregation of partial fingerprint samples and an identification of the fingerprint sampling pattern, as described above.

The hidden setup process selects the set of fingerprint samples to use to generate one or multiple fingerprint templates. For example, the hidden setup process may identify the most detected finger from which the fingerprint samples pertain or identify multiple fingers that satisfy a threshold value. In this way, after the fingerprint identification service is activated on the user device, and the user may not know which finger was used to generate the fingerprint template, there is a high probability that the user will naturally use the correct finger to gain access and use of the user device since the fingerprint template is based on the fingerprint sampling pattern.

In some cases, the user device is used by multiple users, which can further complicate matters since different fingerprint samples may belong to the same user using different fingers or belong to different users.

According to an exemplary embodiment, the hidden setup process obtains and stores fingerprint samples within a certain time window. For example, the time window may span between after boot-up of the user device is completed to the turning off of the user device, or span from when the user device is in an active state to when the user device enters another state (e.g., idle, sleep, etc.), or some other configurable time window. According to another exemplary implementation, the time window is a default time period. For example, the default time period may be for one hour, two hours, or some other time period. The default time period may begin to run from a particular triggering event. For example, the triggering event may be after boot-up is completed or any other configurable triggering event (e.g., user action, such as start-up of an application, access to another device (e.g., a server, etc.) via the user device, etc.). In this way, there is a high probability that the same user is operating the user device during the particular time window and the fingerprint sample(s) that is/are obtained during the time window belong to the same user.

According to an exemplary embodiment, the hidden setup process maps the fingerprint template to a particular user based on fingerprint samples obtained during a time window, as previously described above. According to another exemplary embodiment, the hidden setup process maps the fingerprint template to a particular user based on fingerprint samples obtained during a time window and the fingerprint sampling pattern.

According to an exemplary embodiment, when the hidden setup process is completed, the user device notifies the user that the biometric security service can be activated. For example, the device may notify the user via a visual cue, an auditory cue, and/or a tactile cue (e.g., a haptic cue or a vibrational cue). By way of further example, the user device may notify the user via a graphical element (e.g., an icon, etc.), a graphical user interface (e.g., a pop-up message, a menu, etc.), a vocal message, and/or vibration, that a fingerprint identification service can be activated.

According to an exemplary embodiment, the user device permits the user to initiate the normal setup process regardless of whether the hidden setup process has been initiated and/or completed. According to an exemplary embodiment, the normal setup process obtains a biometric sample obtained from the hidden setup process, if available. For example, the normal setup process may obtain a fingerprint template or a fingerprint sample that has been stored during the hidden setup up process. This may occur, for example, when the hidden setup process has not been fully completed or the fingerprint identification service has not been activated, and the user initiates the normal setup process. In this way, the normal setup process may expedite and forgo obtaining a fingerprint sample and/or generating a fingerprint template unnecessarily. Alternatively, according to another exemplary embodiment, the normal setup process automatically deletes any and all fingerprint data obtained during the hidden setup process.

FIG. 1A is a diagram of an exemplary user device 100 in which exemplary embodiments described herein may be implemented. While illustratively speaking based on FIG. 1A, user device 100 may be representative of, for example, a smartphone, a cellphone, or a personal digital assistant (PDA), user device 100 may be implemented as various other types of user devices. For example, user device 100 may take the form of a tablet device, a data organizer, a picture capturing device, a video capturing device, a Web-access device, a computer, a palmtop device, a netbook, a gaming device, a location-aware device, a music playing device, or some other type of consumer device. Alternatively, user device 100 may be implemented as a non-consumer device, a non-mobile device, or any other form of an electronic device.

As illustrated in FIG. 1A, user device 100 comprises a housing 105, a microphone 110, a speaker 115, a button 120, and a display 125. As described further below, button 120 comprises a fingerprint reader.

According to other embodiments, user device 100 may comprise fewer components, additional components, different components, and/or a different arrangement of components than those illustrated in FIG. 1A and described herein. For example, user device 100 may include a port (e.g., a headphone port, a Universal Serial Bus (USB) port, a High Definition Multimedia Interface (HDMI) port, or some other type of input port and/or output port, etc.), a camera, a keypad, a keyboard, a biometric reader (e.g., retina, etc), etc. Additionally, or alternatively, user device 100 may take the form of a different configuration (e.g., a slider, a clamshell, a swivel, etc.) than the configuration illustrated in FIG. 1A. Also, according to other embodiments, button 120 does not comprise a fingerprint reader. Rather, a portion of housing 105 comprises the fingerprint reader.

Housing 105 comprises a structure to contain components of user device 100. For example, housing 105 may be formed from plastic, metal, or some other type of material. Housing 105 may support microphone 110, speaker 115, button 120, and display 125.

Microphone 110 is capable of transducing a sound wave to a corresponding electrical signal. For example, a user may speak into microphone 110 during a telephone call or to execute a voice command. Speaker 115 is capable of transducing an electrical signal to a corresponding sound wave. For example, the user may listen to music or listen to a calling party through speaker 115.

Button 120 provides an input to user device 100. Button 120 may provide a single or dedicated function (e.g., fingerprint reading) or multiple functions. For example, button 120 may provide fingerprint reading and powering on and off of user device 100. Alternatively, button 120 may provide fingerprint reading and performing a camera function, volume control, and/or some other type of function (e.g., waking up user device 100, causing a dark display to become active, etc.). Button 120 may be a hardware button. For example, button 120 may be a push-button. Additionally, or alternatively, button 120 may be a capacitive-touch button. As previously described, according to an exemplary embodiment, button 120 includes a fingerprint reader (also known in the art as a fingerprint scanner or a fingerprint sensor).

As previously described, according to other embodiments, the fingerprint reader is not incorporated or implemented as a button. For example, the fingerprint reader may be incorporated into housing 105. According to such an embodiment, the fingerprint reader is situated in a location that lends itself to obtain a fingerprint from the user during usage of user device 100. For example, the location may be on a side of user device 100 where the user would naturally place his or her finger when holding user device 100 in his or her hand (e.g., left hand and/or right hand).

Display 125 operates as an output component. For example, display 125 may comprise a liquid crystal display (LCD), a plasma display panel (PDP), a field emission display (FED), a thin film transistor (TFT) display, or some other type of display technology (e.g., organic LED (OLED), active matrix OLED (AMOLED), etc). Display 125 is capable of displaying text, pictures, video, various images (e.g., icons, objects, etc.). Display 125 may also be capable of providing haptic or tactile feedback.

Figure 1B:
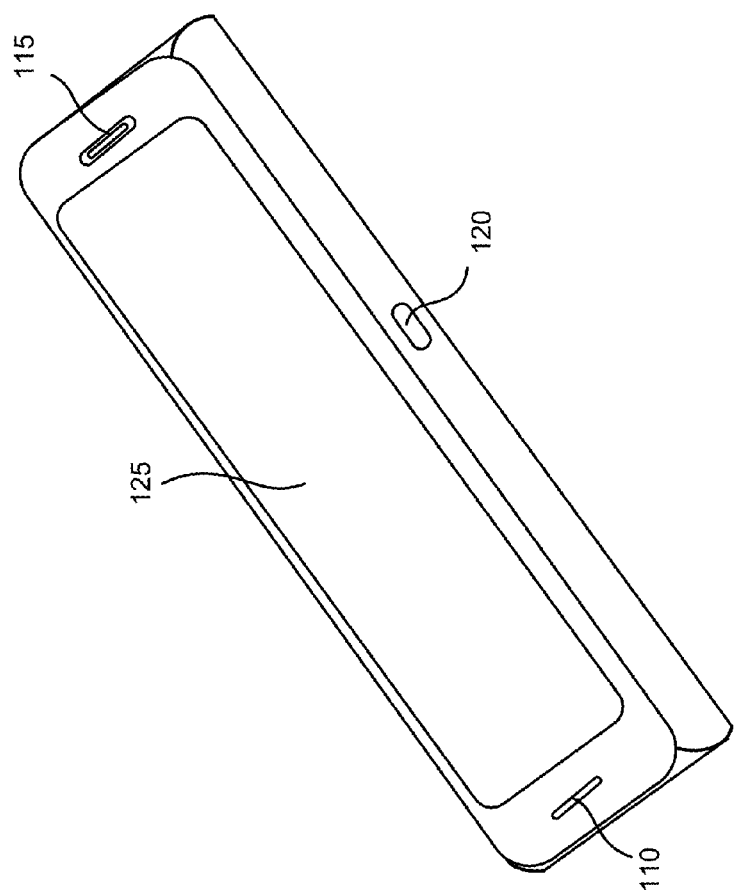

Additionally, display 125 may operate as an input component. For example, display 125 may comprise a touch-sensitive screen. Display 125 may be implemented using a variety of sensing technologies, such as capacitive sensing, surface acoustic wave sensing, resistive sensing, optical sensing, pressure sensing, infrared sensing, or gesture sensing. In such instances, display 125 may operate as a single-point input device (e.g., capable of sensing a single touch) or a multipoint input device (e.g., capable of sensing multiple touches that occur at the same time). Additionally, or alternatively, display 125 may comprise a touchless screen (e.g., having air-touch, air-gesture capabilities). FIG. 1B is a diagram illustrating another view of user device 100.

FIG. 2A is a diagram illustrating exemplary components of user device 100. As illustrated, user device 100 includes a processor 205, a memory/storage 210, software 215, a communication interface 220, an input 225, and an output 230. According to other embodiments, user device 100 may include fewer components, additional components, different components, and/or a different arrangement of components than those illustrated in FIG. 2A and described herein.

Processor 205 includes one or multiple processors, microprocessors, data processors, co-processors, and/or some other type of component that interprets and/or executes instructions and/or data. Processor 205 may be implemented as hardware (e.g., a microprocessor, etc.) or a combination of hardware and software (e.g., a system-on-chip (SoC), an application-specific integrated circuit (ASIC), etc.). Processor 205 performs one or multiple operations based on an operating system and/or various applications or programs (e.g., software 215).

Memory/storage 210 includes one or multiple memories and/or one or multiple other types of storage mediums. For example, memory/storage 210 may include a random access memory (RAM), a dynamic random access memory (DRAM), a cache, a read only memory (ROM), a programmable read only memory (PROM), and/or some other type of memory. Memory/storage 210 may include a hard disk (e.g., a magnetic disk, an optical disk, a magneto-optic disk, a solid state disk, etc.).

Software 215 includes an application or a program that provides a function and/or a process. Software 215 may include firmware. By way of example, software 215 may comprise a telephone application, a multi-media application, an e-mail application, a contacts application, a calendar application, an instant messaging application, a web browsing application, a location-based application (e.g., a Global Positioning System (GPS)-based application, etc.), a camera application, etc. Software 215 includes an operating system (OS). For example, depending on the implementation of user device 100, the operating system may correspond to iOS, Android, Windows Phone, Symbian, or another type of operating system (e.g., proprietary, BlackBerry OS, Windows, Linux, etc.). According to an exemplary embodiment, software 215 includes an application that, when executed, provides a hidden fingerprint setup, as described herein. Additionally, according to an exemplary embodiment, software 215 includes an application that, when executed, provides a normal fingerprint setup. According to other embodiments, software 215 includes an application that, when executed, provides a hidden setup and a normal setup for another type of biometric security service.

Communication interface 220 permits user device 100 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 operates according to one or multiple protocols, communication standards, and/or the like.

Input 225 permits an input into user device 100. For example, input 225 may include a button, a switch, a touch pad, an input port, speech recognition logic, and/or a display (e.g., a touch display, a touchless display). According to an exemplary embodiment, input 225 includes a fingerprint reader. According to other embodiments, input 225 includes another type of biometric device. Output 230 permits an output from user device 100. For example, output 230 may include a speaker, a display, a light, an output port, and/or some other type of output component.

User device 100 may perform a process and/or a function in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 causes processor 205 to perform the process or the function. Alternatively, user device 100 may perform a process or a function based on the operation of hardware (processor 205, etc.).

Figure 2B:
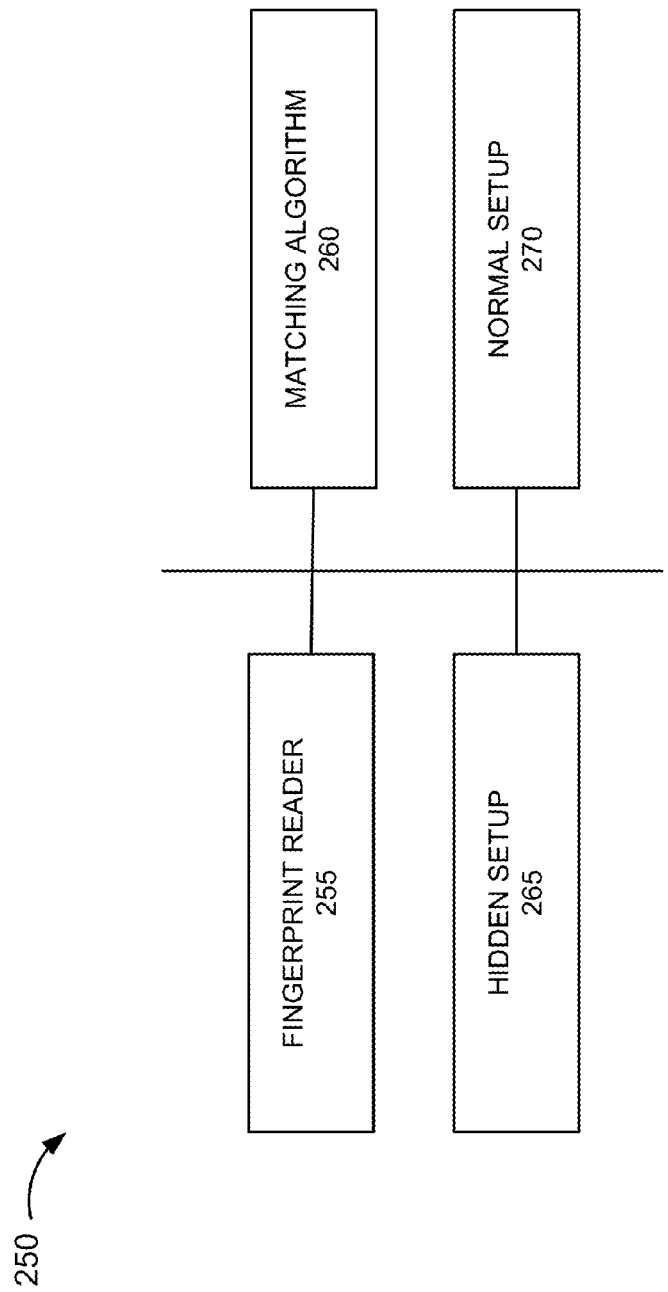
FIG. 2B is a diagram illustrating exemplary components of a biometric system.

FIG. 2B is a diagram illustrating exemplary components of an exemplary embodiment of a fingerprint system 250. As illustrated, fingerprint system 250 includes a fingerprint reader 255, a matching algorithm 260, a hidden setup 265, and a normal setup 270. According to other embodiments, fingerprint system 250 may include additional components, different components, and/or a different arrangement of components than those illustrated in FIG. 2B and described herein. The connections between the components are exemplary. Additionally, according to other embodiments, similar components directed to other forms of biometrics (e.g., vocal, retinal, etc.) may be implemented, in which a reader, a matching algorithm, a hidden setup, and a normal setup are included in a biometric system.

Fingerprint reader 255 includes a fingerprint scanner, a fingerprint sensor, or a fingerprint detector that captures fingerprint data. For example, fingerprint reader 255 may include any suitable fingerprint sensor such as an optical sensor, a passive capacitance sensor, an active capacitance sensor, or an ultrasonic sensor. In some embodiments, fingerprint reader 255 may be a touch-based or non-swipe based fingerprint sensor. According to an exemplary embodiment, button 120 includes fingerprint reader 255. According to another exemplary embodiment, button 120 does not include fingerprint reader 255. Rather, housing 105 includes fingerprint reader 255.

According to an exemplary embodiment, fingerprint reader 255 captures a partial fingerprint sample of the user's finger. For example, referring to FIG. 1B, due to the depth or thickness of user device 100 and the location of button 120, fingerprint reader 255 may include a fingerprint sensor area that is smaller (e.g., width-wise and/or length-wise) relative to the size of a user's finger from which a sample is captured. In this regard, when a sample is captured, the sample may represent a relatively small portion or slice of the user's finger (i.e., a partial fingerprint of the user's finger) compared to fingerprint readers that have a larger fingerprint sensor area (e.g., equivalent or nearly equivalent to a fingertip area of a person's finger or the entire finger (e.g., index finger, etc)). For purposes of ease of description, the phrase "fingerprint sample" is intended to also mean "partial fingerprint sample."

According to such an embodiment, fingerprint reader 255 includes logic to aggregate a number of partial fingerprint samples. In this way, fingerprint reader 255 may generate a more "complete" or "whole" fingerprint sample that represents a larger portion of the user's finger than the partial fingerprint sample. According to an exemplary implementation, fingerprint reader 255 uses an algorithm similar to a matching algorithm (e.g., a pattern-based, an image-based, etc.) to identify matching portions between partial fingerprint samples. These matching portions represent an overlap. For example, on different occasions of usage of user device 100, the user may place a different area and a same area of his or her finger on button 120. Additionally, while grasping user device 100, the user's finger may move slightly so that fingerprint reader 255 can capture different areas of the user's fingers. As previously described, there is a likelihood that the user will operate button 120 or grasp user device 100 using the same set of fingers. In this regard, fingerprint reader 255 is likely to identify matching portions between partial fingerprint samples and be able to generate a more "complete" or "whole" fingerprint sample based on an aggregation of partial fingerprint samples. Since there may be differences between partial fingerprint samples or fingerprint samples due to variability in displacement, rotation, scanned regions, etc., which may be due to the physical placement of a finger, pressure of finger during placement, etc., fingerprint reader 255 includes logic (e.g., minutiae-based matching, non-minutiae feature-based matching, etc.) that provides alignment and matching.

Fingerprint reader 255 may obtain fingerprint data based on an "always on" criteria prior to and/or after the activation of the fingerprint identification service. That is, whenever user device 100 is powered on, fingerprint reader 255 may obtain a fingerprint sample from the user. Alternatively, prior to activation of the fingerprint identification service, fingerprint reader 255 may obtain a fingerprint sample based on an activation (e.g., a command) from hidden setup 265. For example, fingerprint reader 255 may obtain a fingerprint sample from the user during a time window, as previously described. Additionally, fingerprint reader 255 may obtain a fingerprint sample based on an activation from normal setup 270. According to an exemplary implementation, fingerprint reader 255 stores fingerprint samples in a secure manner using encryption. Additionally, fingerprint reader 255 may store fingerprint samples in a database or a data structure. Fingerprint reader 255 also captures a candidate fingerprint from a user after the fingerprint identification service is activated, which can be used by matching algorithm 260 to determine whether the candidate fingerprint matches the fingerprint template.

Fingerprint reader 255 includes logic to generate a fingerprint template (also known in the art as a fingerprint signature) based on the fingerprint samples captured. For example, fingerprint reader 255 generates a fingerprint template based on identifying a fingerprint sampling pattern, as previously described herein. Additionally, or alternatively, fingerprint reader 255 generates a fingerprint template based on a determination that an aggregation of partial fingerprint samples constitutes a more complete or whole fingerprint sample, as previously described. Fingerprint reader 255 may map a fingerprint template to a user. According to an exemplary implementation, fingerprint reader 255 stores the fingerprint template in a secure manner using encryption. Additionally, fingerprint reader 255 may store the fingerprint template in a database or a data structure. Fingerprint reader 255 may signal or communicate to hidden setup 265 that the fingerprint template has been generated.

Matching algorithm 260 includes logic to compare a stored fingerprint template or signature against a candidate fingerprint obtained from the user when the fingerprint identification service is activated. The stored fingerprint template may have been generated based on the hidden setup process, the normal setup process, or both. Based on the comparison between the fingerprint template and the candidate fingerprint, matching algorithm 260 determines whether a match exists. When a match exists, the user is verified or authenticated. When a match does not exist, the user is not verified or authenticated. Matching algorithm 260 may cause the user to be granted or denied usage and/or access of user device 100 based on a result of the comparison.

Matching algorithm 260 may be implemented as a pattern-based algorithm or an image-based algorithm. For example, the pattern-based algorithm may compare fingerprint patterns (e.g., arch, whorl, and loop) between a stored fingerprint template and the candidate fingerprint. The stored fingerprint template may include various attributes, such as type, size, and orientation of patterns. Alternatively, matching algorithm 260 may be implemented as a minutia-based algorithm. For example, matching algorithm 260 may compare several minutia points (e.g., ridge ending, bifurcation, and short ridge) extracted from a template image, which serve as the template, with those features extracted from a candidate fingerprint image. Matching algorithm 260 may determine a degree (e.g., a number of minutia points or other feature) in which the fingerprint template and the candidate fingerprint match. For example, matching algorithm 260 may determine a level of similarity (difference or hamming distance). Matching algorithm 260 may make a decision based on a score and its relationship (above or below) relative to a predetermined threshold.

Hidden setup 265 includes logic to automatically invoke a hidden setup process during the user's usage of user device 100. For example, hidden setup 265 may invoke the hidden setup process during a time that the user has not invoked a "normal" setup process (e.g., via normal setup 270) and/or the fingerprint identification service of user device 100 has not been activated. For example, hidden setup 265 may determine whether the user has requested the normal setup process (e.g., via normal setup 270). According to an exemplary embodiment, hidden setup 265 includes logic to activate fingerprint reader 255 and cause fingerprint reader 255 to obtain fingerprint samples. For example, hidden setup 265 may activate and deactivate fingerprint reader 255 based on a time window.

According to an exemplary embodiment, hidden setup 265 informs and/or prompts the user that the fingerprint identification service can be activated based on receiving an indication from fingerprint reader 255 that a fingerprint template has been generated. For example, hidden setup 265 may notify and/or prompt the user via various forms of notifications, such as a visual notification, an auditory notification, and/or a haptic/vibrational notification. By way of further example, a visual notification may include a graphical element included in a system tray or a notification area that indicates to the user that the fingerprint identification service can be activated. Additionally, or alternatively, hidden setup 265 may notify the user via a menu (e.g., a settings menu, etc.,) or via an icon (e.g., an icon displayed on a main/home screen of user device 100, etc.).

According to an exemplary embodiment, when the user wishes to activate the fingerprint identification service based on the indication or the prompt, hidden setup 265 activates the fingerprint identification service. According to an exemplary embodiment, the activation process includes a verification process. For example, in case multiple users use user device 100, hidden setup 265 may prompt the user to verify that the fingerprint template belongs to that user. Additionally, or alternatively, the verification process may be performed even in case of a single user. By way of example, the user may be presented with a GUI to verify that the fingerprint template belongs to the user. The GUI may also provide historical data pertaining to the fingerprint template, such as the day and the time fingerprint samples were obtained. Additionally, or alternatively, the GUI may prompt the user to provide a fingerprint sample. Matching algorithm 260 determines whether a match exists between the fingerprint sample and the fingerprint template. If a match does not exist, the user may be required to provide additional fingerprint samples so that a fingerprint template can be generated. Alternatively, the user may be asked whether he or she would like to begin a normal setup process. If matching algorithm 260 determines that a match exists between the fingerprint sample and the fingerprint template, the verification process is completed and the fingerprint identification service is activated.

After the verification process or activation of the fingerprint identification service, hidden setup 265 may provide various GUIs to allow the user to indicate any user preferences pertaining to the fingerprint identification service. For example, the user may wish to have the fingerprint identification service activated only in certain locations (e.g., work, outside the home, etc.), during certain times of day, when user device 100 operates in a particular mode (e.g., a work mode, etc.), etc.

Normal setup 270 includes logic that provides for a user-invoked, setup process that allows the user to unlock a fingerprint identification service. By way of further example, the user may access, via a graphical user interface (GUI), a settings screen or select an icon to initiate the setting up of the fingerprint identification service. Thereafter, the normal setup process may include prompting the user to provide one or multiple samples of his or her fingerprint. The user may be informed, via a GUI, when fingerprint system 250 has received a sufficient number of and/or satisfactory sampling of the user's fingerprint. The user may then have the option to activate the fingerprint identification service. The normal setup process may also offer various GUIs to allow the user to indicate any user preferences pertaining to the fingerprint identification service.

According to an exemplary embodiment, the user may invoke and complete, at any time, the normal setup process. According to an exemplary embodiment, hidden setup 265 deletes any stored fingerprint samples based on the user's initiation of the normal setup process via normal setup 270. According to another exemplary embodiment, normal setup 270 may inform the user, via a GUI, that a fingerprint sample has been obtained through the hidden setup process and may be used to facilitate the setting up of the fingerprint identification service through the normal setup process. The user may accept or decline. When the user accepts, normal setup 270 uses the fingerprint sample (or fingerprint template) to complete the normal setup process. When the user declines, normal setup 270 deletes any and all stored fingerprint samples and/or fingerprint template pertaining to the user. Additionally, for example, hidden setup 265 may be disabled to prevent further execution of hidden setup 265. Normal setup 270 obtains a fingerprint sample, generates a fingerprint template, etc., so as to complete the normal setup process.

Although fingerprint system 250 has been described in which particular functions are performed by a particular functional element (e.g., fingerprint reader 255, hidden setup 265, etc.), according to other embodiments, the particular function may be performed by another functional element of fingerprint system 250 or a combination of functional elements.

Figure 3A:
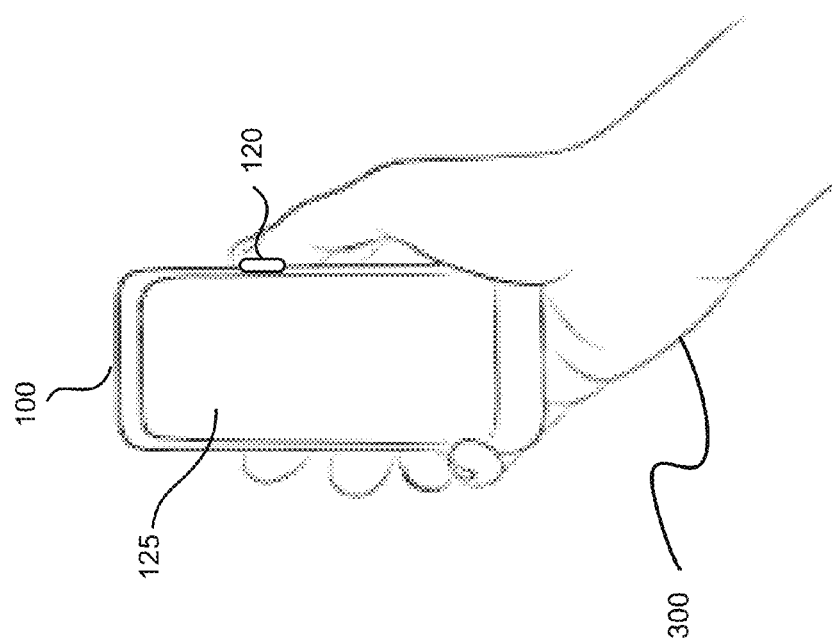
FIGS. 3A-3G are diagrams illustrating an exemplary process pertaining to an embodiment of a hidden fingerprint setup.

FIGS. 3A-3G are diagrams illustrating an exemplary process pertaining to an exemplary embodiment of a hidden fingerprint setup. Referring to FIG. 3A, assume a user 300 is holding user device 100 in his or her hand. During this time, the thumb of user 300 touches button 120. For example, user 300 touches button 120 while looking at display 125. Also assume that hidden setup 265 is an application that is running in the background. For example, hidden setup 265 is implemented as a daemon application that executes upon boot-up of user device 100.

Figure 3B:
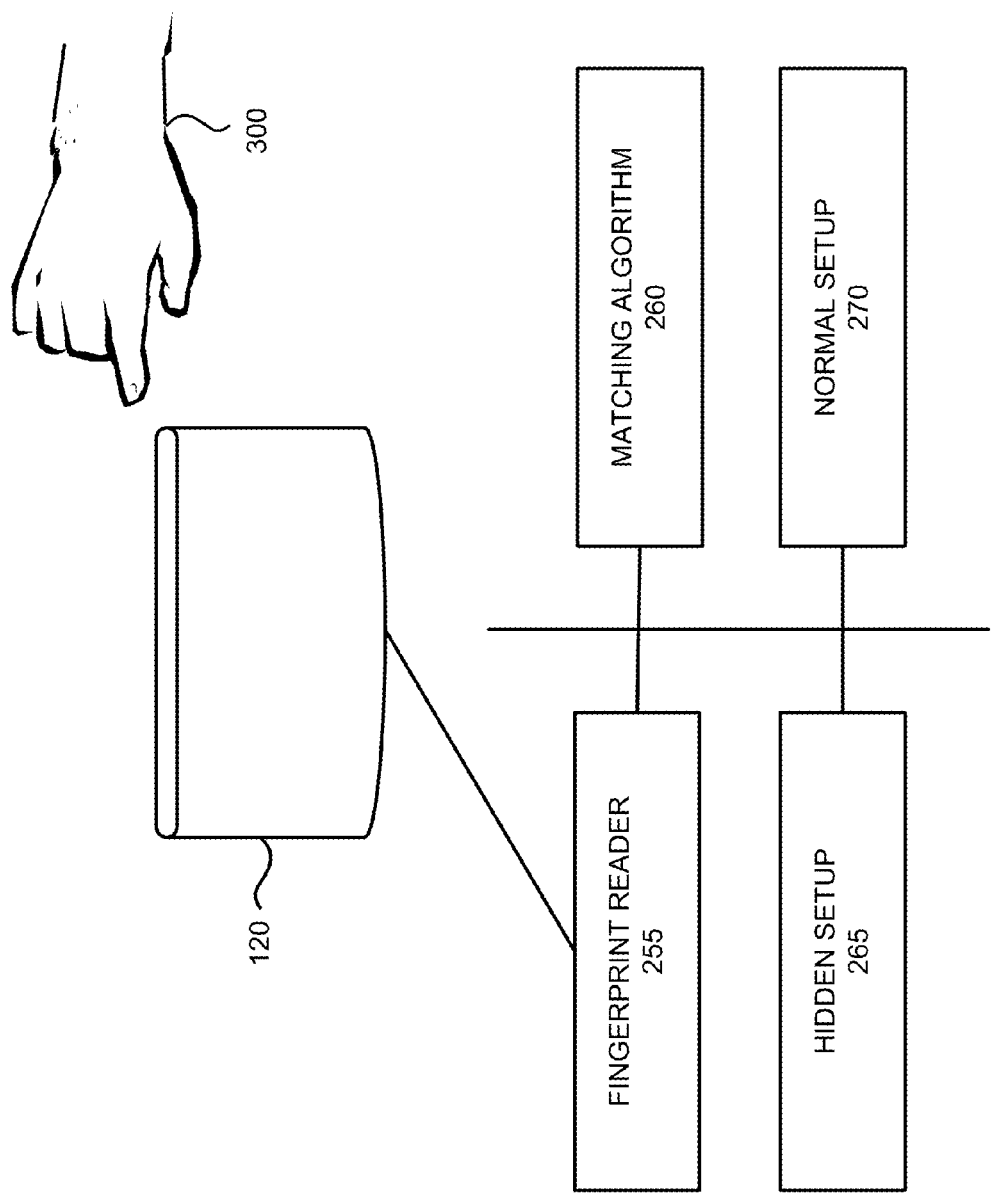

Referring to FIG. 3B, as user 300 touches button 120, fingerprint reader 255 captures a fingerprint of user 300 and stores a fingerprint sample. Fingerprint reader 255 determines whether a fingerprint sampling pattern can be identified. According to this example, assume that fingerprint reader 255 identifies the fingerprint sampling pattern (e.g., one or multiple threshold values have been satisfied). In turn, fingerprint reader 255 generates a fingerprint template and stores the fingerprint template. The fingerprint sample and the fingerprint template may be securely stored (e.g., encrypted).

In response to the generation of the fingerprint template, hidden setup 265 provides a cue to user 300 that the fingerprint identification service can be activated. As previously described, hidden setup 265 may provide a visual cue, an auditory cue, a haptic cue, etc. Described below are exemplary GUIs pertaining to the activation of the fingerprint identification service. The graphical elements and the screens of which they pertain are purely exemplary.

Figure 3C:
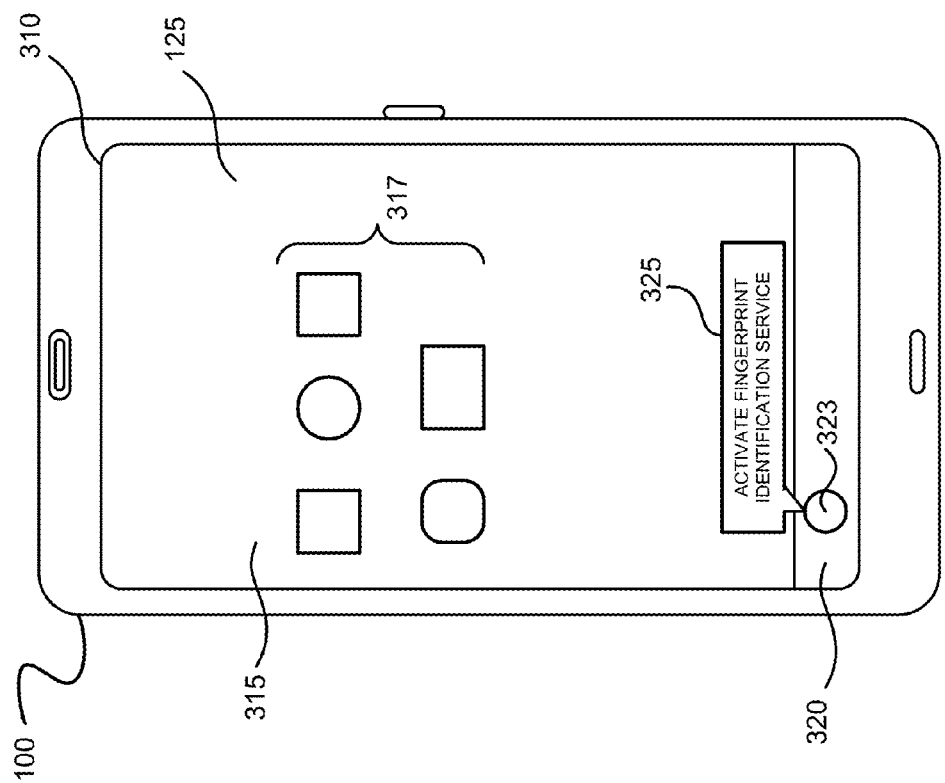
Figure 3D:
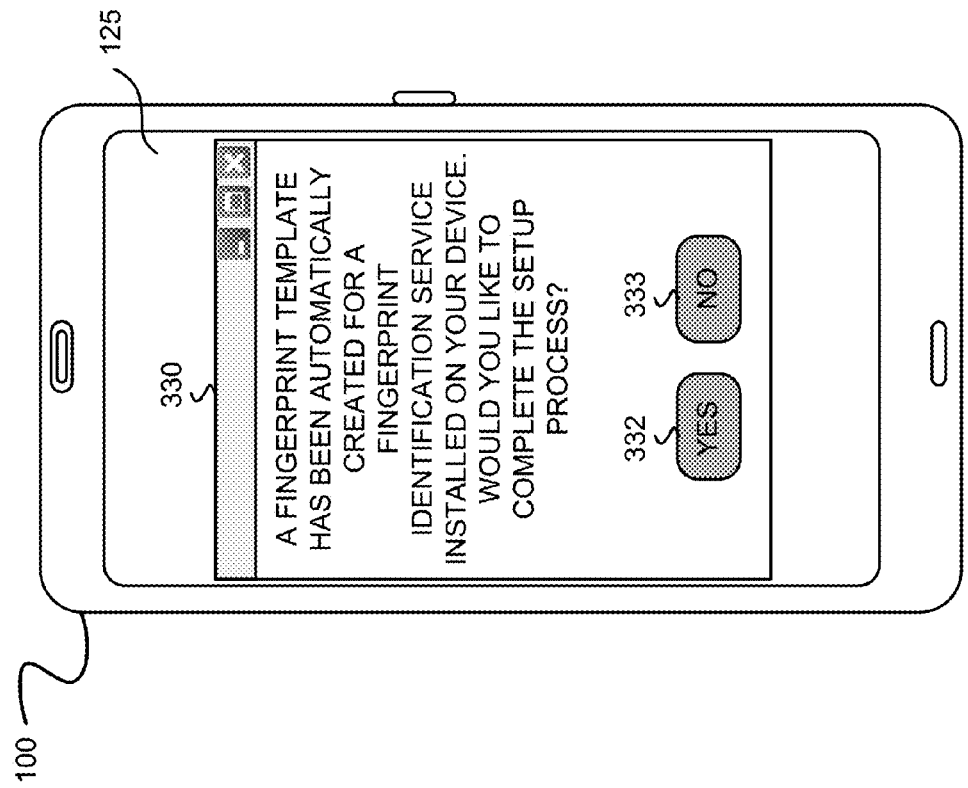

Referring to FIG. 3C, as previously described, user 300 may be prompted to activate the fingerprint identification service via a home screen. For example, as illustrated, display 125 may display a home screen 310. Home screen 310 may include a desktop area 315 that includes various icons 317 and a notification area 320. As illustrated, notification area 320 may include an icon 323. Icon 323 may be an interactive graphical element that, when selected, allows user 300 to complete the setup process. Additionally, for example, when user 300 hovers over icon 323, using his or her finger or an instrument (e.g., a stylus), a message 325 appears that prompts user 300 to activate the fingerprint identification service.

According to this example, assume that user 300 selects icon 323. In response, and referring to FIG. 3D, a pop-up window 330 appears on display 125 that requests whether the user would like to complete the setup process. Pop-up window 330 may include a "yes" button 332 and a "no" button 333. In the event that user 300 selects "no" button 333, another pop-up window may appear (not illustrated), which indicates that the fingerprint template will be securely saved and that the user may access the settings menu for more information. According to this example, assume that user 300 selects "yes" button 332.

Figure 3E:
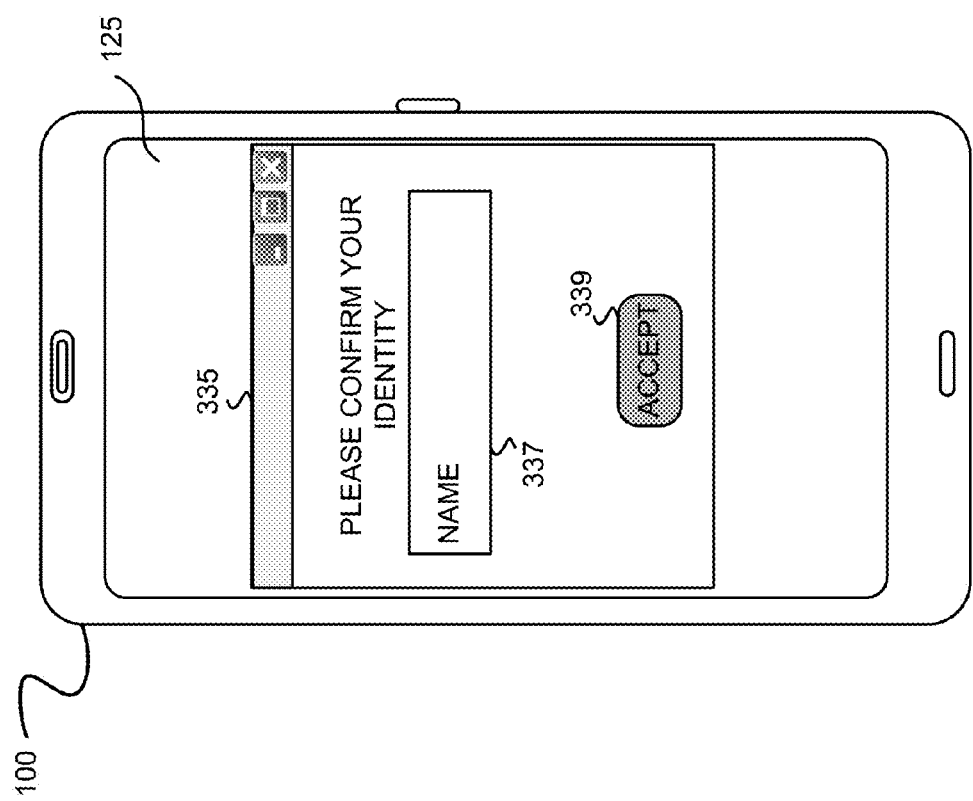

Referring to FIG. 3E, in response to user 300 selecting "yes" button 332, a pop-up window 335 appears that requires confirmation of user 300. For example, pop-up window 335 may prompt user 300 to enter his or her name in an input box 337. User 300 may select an "accept" button 339 after entering his or her name. According to this example, assume user 300 enters his or her name in input box 337 and selects "accept" button 339. According to another exemplary implementation, a GUI (not illustrated) prompts the user to provide a fingerprint sample. Thereafter, matching algorithm 260 may determine whether a match exists, as previously described.

Figure 3F:
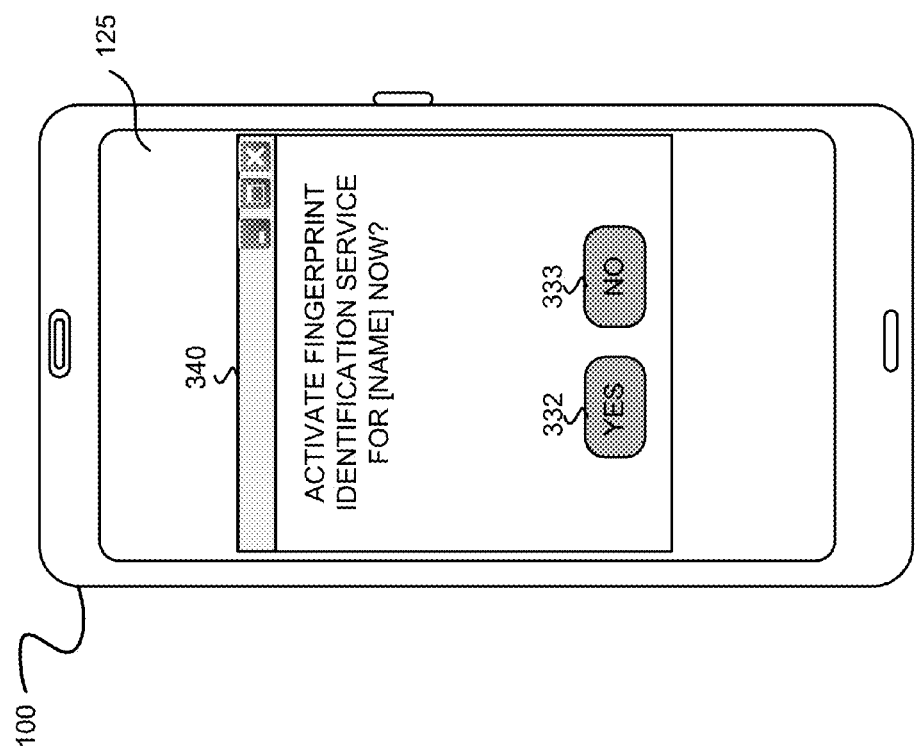
Figure 3G:
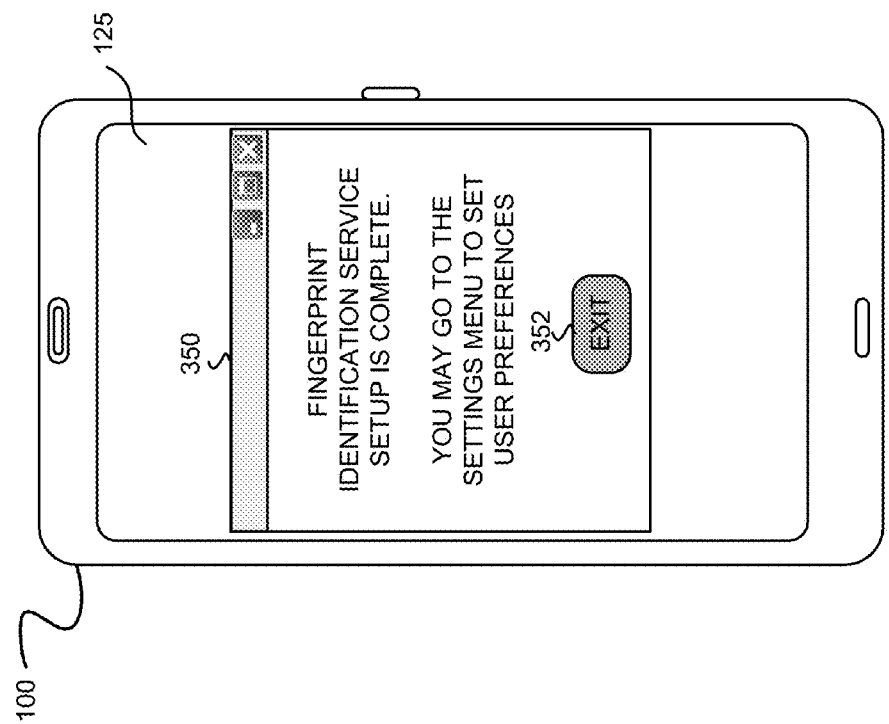

Referring to FIG. 3F, a pop-up window 340 appears that requests whether to activate the fingerprint identification service now and provides "yes" button 332 and "no" button 333. According to this example, assume user 300 selects "yes" button 332. Referring to FIG. 3G, in response to user 300 selecting "yes" button 332, a pop-up window 350 appears that indicates to user 300 that the fingerprint identification service setup is complete. As further illustrated, pop-up window 350 may also indicate that user 300 may go the "settings menu" to set user preferences. For example, the fingerprint identification service may include various user preferences, as previously described. According to this example, user 300 selects an "exit" button 352 and the fingerprint identification service is activated.

According to an exemplary embodiment, after completion of the setup process, hidden setup 265 may no longer run as a background application of user device 100. According to another exemplary embodiment, hidden setup 265 may continue to run. For example, when multiple users operate user device 100 and not all users have completed the setup process, hidden setup 265 may continue to run.

While FIGS. 3A-3G illustrate an exemplary process pertaining to a hidden fingerprint setup, according to other embodiments, the process may include additional, different, or fewer steps or acts.

Figure 4:
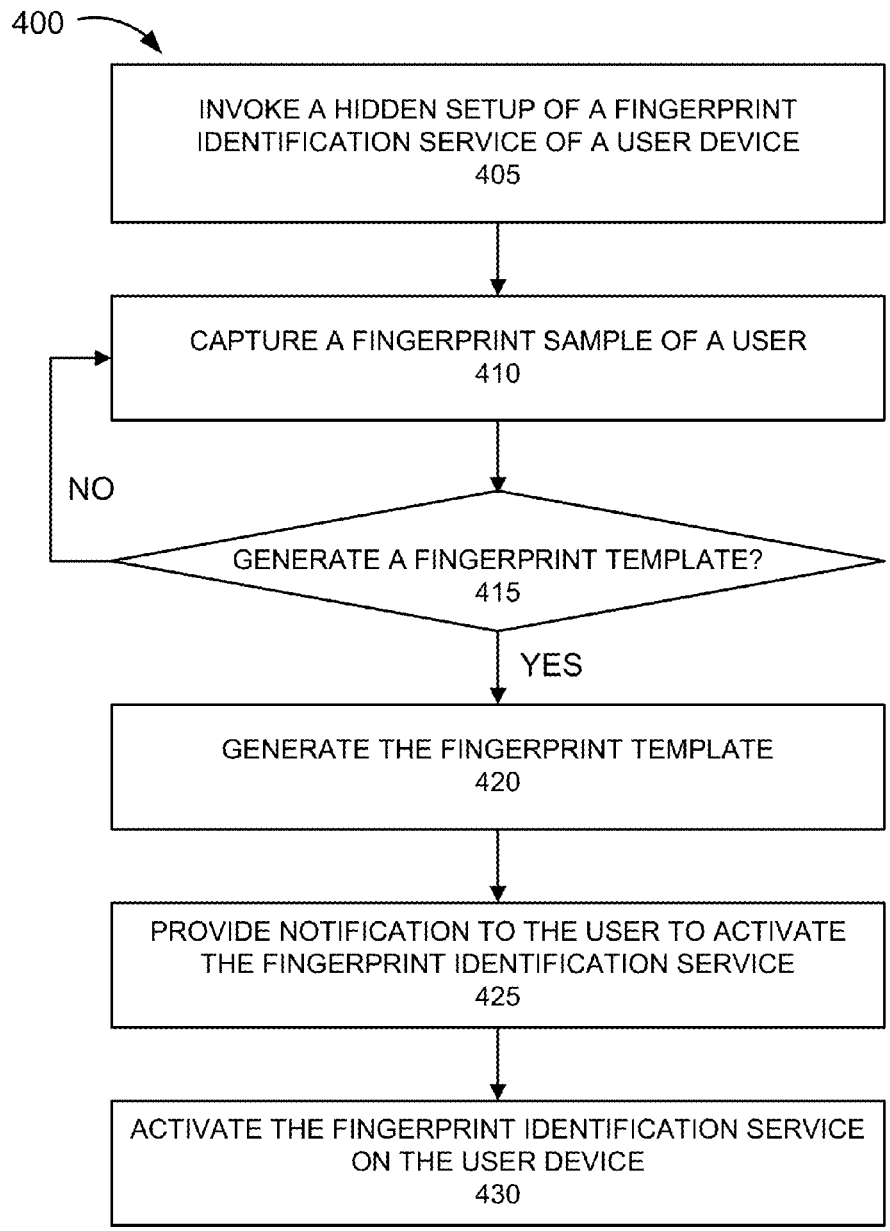
FIG. 4 is a flow diagram illustrating an exemplary process of a hidden fingerprint setup.

FIG. 4 is a flow diagram illustrating an exemplary process 400 to provide a hidden fingerprint setup. A step or an act described in process 400 may be performed by one or multiple components of user device 100. For example, processor 205 may execute software 215 to perform the step or the act described and/or a functional element of fingerprint system 250 performs the step or the act described.

Referring to FIG. 4, in block 405, a hidden setup of a fingerprint identification service of a user device is invoked. For example, hidden setup 265 and fingerprint reader 255 may be configured to automatically operate when a fingerprint identification service is not activated on user device 100 and normal setup 270 has not been invoked by a user.

In block 410, a fingerprint sample is captured. For example, fingerprint reader 255 captures a fingerprint sample from a user of user device 100. According to various implementations, fingerprint reader 255 may capture the fingerprint sample based on an "always on" criteria or based on a time window, as previously described. Fingerprint reader 255 stores the fingerprint sample.

In block 415, it is determined whether to generate a fingerprint template. For example, fingerprint reader 255 determines whether to generate the fingerprint template based on whether a fingerprint sampling pattern can be identified, as previously described. Additionally, or alternatively, fingerprint reader 255 determines whether to generate the fingerprint template based on whether an aggregation of partial fingerprint samples constitutes a more complete or whole fingerprint sample, as previously described.

If it is determined to not generate the fingerprint template (block 415-NO), then process 400 continues to block 410. For example, fingerprint reader 255 captures another fingerprint sample from the user. For example, fingerprint reader 255 may continue to capture fingerprint samples over a period of time (e.g., a few days, a week, etc.). This is in contrast to a normal setup process that sets up the fingerprint identification service.

If it is determined to generate the fingerprint template (block 415-YES), then fingerprint reader 255 generates a fingerprint template (block 420). For example, fingerprint reader 255 selects one or multiple stored fingerprint samples and generates a fingerprint template pertaining to the user. Fingerprint reader 255 stores the fingerprint template.

In block 425, a notification is provided to the user. For example, in response to receiving an indication that the fingerprint template is generated, hidden setup 265 provides a notification or a cue to the user. For example, the notification or the cue may indicate to the user that the user can activate the fingerprint identification service. As previously described, the notification or the cue may be implemented in a visual, auditory, and/or tactile manner.

In block 430, the fingerprint identification service is activated. For example, when hidden setup 265 receives a request from the user, in response to the notification or the cue, to activate the fingerprint identification service, hidden setup 265 activates the fingerprint identification service. As previously described, the activation process may include a verification process.

Although FIG. 4 illustrates an exemplary process 400 to provide the hidden fingerprint setup, according to other embodiments, process 400 may include additional operations, fewer operations, and/or different operations than those illustrated in FIG. 4, and as described.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, a dedicated processor (not illustrated), etc.) or a combination of hardware and software (e.g., software 215). The embodiments have been described without reference to the specific software code since software can be designed to implement the embodiments based on the description herein and the accompanying drawings.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 210.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

No element, act, or instruction described in the present application should be construed as critical or essential to the embodiments described herein unless explicitly described as such.

What is claimed is:

1. A method comprising:
invoking, by a user device, a setup of a fingerprint identification service of the user device, wherein the setup automatically sets up the fingerprint identification service without receiving a request from a user of the user device to set up the fingerprint identification service, and wherein the setup comprises:
capturing, by the user device, a fingerprint sample of the user of the user device;
storing, by the user device, the fingerprint sample;
determining, by the user device, whether to generate a fingerprint template, wherein determining whether to generate the fingerprint template comprises determining whether a fingerprint sampling pattern pertaining to the user can be identified;
identifying the fingerprint sampling pattern based on one or more threshold values being satisfied, wherein one of the one or more threshold values includes that a threshold frequency of fingerprint samples belonging to a same finger of the user are stored;
generating, by the user device, the fingerprint template based on determining to generate the fingerprint template;
storing, by the user device, the fingerprint template;
providing, by the user device, a notification to the user that indicates that the fingerprint identification service can be activated;
receiving, by the user device, from the user, a request to activate the fingerprint identification service; and
activating, by the user device, the fingerprint identification service based on the request to activate the fingerprint identification service.

2. The method of claim 1, wherein the capturing comprises:
capturing the fingerprint sample without prompting the user to provide the fingerprint sample.

3. The method of claim 1, wherein the fingerprint sample is captured via a button of the user device, and wherein after activating the fingerprint identification service, the fingerprint identification service governs access to the user device.

4. The method of claim 1, wherein determining whether to generate the fingerprint template further comprises:
determining whether an aggregation of fingerprint samples constitutes a complete fingerprint sample based on a threshold value that indicates a minimum area for the complete fingerprint sample.

5. The method of claim 1, wherein the activating further comprises:
prompting, by the user device, via a graphical user interface, that the user verify that the fingerprint template belongs to the user.

6. A user device comprising:
a fingerprint reader;
a memory, wherein the memory stores software; and
a processor, wherein the processor is configured to execute the software to:

invoke a setup of a fingerprint identification service of the user device, wherein the setup automatically sets up the fingerprint identification service without receiving a request from a user to set up the fingerprint identification service, and wherein the processor is further configured to execute the software to:

capture, via the fingerprint reader, a fingerprint sample of the user of the user device based on an invocation of the setup;

store the fingerprint sample;

determine whether to generate a fingerprint template, wherein, when determining whether to generate the fingerprint template, the processor is further configured to execute the software to:

determine whether a fingerprint sampling pattern pertaining to the user can be identified based on one or more threshold values being satisfied, wherein one of the one or more threshold values include that a threshold frequency of fingerprint samples belonging to a same finger of the user are captured;

generate the fingerprint template based on a determination to generate the fingerprint template;

store the fingerprint template;

provide a notification to the user that indicates that the fingerprint identification service can be activated;

receive a request to activate the fingerprint identification service from the user; and activate the fingerprint identification service based on the request to activate the fingerprint identification service.

7. The user device of claim 6, further comprising:

a button, wherein the button comprises the fingerprint reader, and wherein the processor is further configured to execute the software to:

aggregate partial fingerprint samples, wherein the fingerprint sample is one of the partial fingerprint samples;

determine whether an aggregation of the partial fingerprint samples constitutes a complete fingerprint sample based on a threshold value that indicates a minimum area of the complete fingerprint sample; and generate the fingerprint template based on a determination that the aggregation of the partial fingerprint samples constitutes the complete fingerprint sample.

8. The user device of claim 6, wherein, when capturing the fingerprint sample, the processor is further configured to execute the software to:

capture the fingerprint sample without prompting the user to provide the fingerprint sample.

9. The user device of claim 6, wherein the processor is further configured to execute the software to:

map the fingerprint template to one of multiple users of the user device, wherein the user is one of the multiple users.

10. The user device of claim 6, wherein the notification comprises a graphical element in a notification area of a home screen.

11. The user device of claim 6, wherein the user device is a wireless mobile device.

12. A non-transitory storage medium that stores instructions executable by a processor of a computational device, which when executed, cause the computational device to:

invoke a setup of a biometric identification service of the computational device, wherein the setup automatically sets up the biometric identification service without receiving a request from a user to set up the biometric identification service;

capture a biometric sample of the user of the computational device;

store the biometric sample;

determine whether to generate a biometric template, wherein the biometric template includes a fingerprint template, and wherein the instructions to determine whether to generate the biometric template comprise instructions to determine whether a fingerprint sampling pattern pertaining to the user can be identified;

identify the fingerprint sampling pattern based on one or more threshold values being satisfied, wherein one of the one or more threshold values includes that a threshold frequency of fingerprint samples belonging to a same finger of the user are stored;

generate the biometric template based on a determination to generate the biometric template;

store the biometric template;

provide a notification to the user that indicates that the biometric identification service can be activated;

receive a request to activate the biometric identification service from the user; and activate the biometric identification service based on the request to activate the biometric identification service.

13. The non-transitory storage medium of claim 12, wherein the biometric identification services comprises a fingerprint identification service.

14. The non-transitory storage medium of claim 12, wherein the biometric sample includes a fingerprint sample, and wherein the instructions to capture comprise instructions to:

capture the fingerprint sample without prompting the user to provide the fingerprint sample.

15. The non-transitory storage medium of claim 12, wherein the computational device is a wireless mobile device.

16. The non-transitory storage medium of claim 12, wherein the notification comprises a graphical element in a notification area of a home screen.

17. The non-transitory storage medium of claim 12, wherein the instructions comprise instructions to:

map the biometric template to one of multiple users of the computational device, wherein the user is one of the multiple users.

18. The non-transitory storage medium of claim 12, wherein the activating further comprises prompting, by the user device, via a graphical user interface, that the user verify that the biometric template belongs to the user.

* * * * *